US 9,754,180 B2

(12) United States Patent
Musuvathy et al.

(10) Patent No.: US 9,754,180 B2
(45) Date of Patent: Sep. 5, 2017

(54) ROBUST AUTOMATIC COMPUTATION OF RIDGES AND VALLEYS OF A HEIGHT FIELD

(71) Applicant: Siemens Product Lifecycle Management Software Inc., Plano, TX (US)

(72) Inventors: Suraj Ravi Musuvathy, Glenmont, NY (US); Livio Dalloro, Princeton, NJ (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 0 days.

(21) Appl. No.: 14/993,293

(22) Filed: Jan. 12, 2016

(65) Prior Publication Data

US 2016/0210531 A1 Jul. 21, 2016

Related U.S. Application Data

(60) Provisional application No. 62/103,654, filed on Jan. 15, 2015.

(51) Int. Cl.
*G06K 9/46* (2006.01)
*G06T 7/13* (2017.01)
(Continued)

(52) U.S. Cl.
CPC ......... *G06K 9/4638* (2013.01); *G06K 9/0008* (2013.01); *G06T 7/13* (2017.01); *G06T 7/181* (2017.01)

(58) Field of Classification Search
CPC .. G06K 9/00214; G06K 9/342; G06K 9/6211; G06K 9/6214; G06K 9/4638; G06T 7/50; G06T 2207/30181
See application file for complete search history.

(56) References Cited

U.S. PATENT DOCUMENTS

| 7,043,080 B1 * | 5/2006 | Dolan | G06K 9/00456 |
| | | | 358/3.13 |
| 2003/0200236 A1 * | 10/2003 | Hong | G06T 11/203 |
| | | | 708/200 |

(Continued)

OTHER PUBLICATIONS

Musuvathy, Suraj, et al. "Principal curvature ridges and geometrically salient regions of parametric B-spline surfaces." Computer-Aided Design 43.7 (2011): 756-770).*

(Continued)

*Primary Examiner* — Amara Abdi

(57) ABSTRACT

A computer-implemented method for computing ridges and valleys of a height field includes a computing platform receiving a plurality of sample points associated with a dataset and an indication of an orientation for referencing the plurality of sample points and applying an interpolation function to the plurality of sample points to determine the height field. The computing platform selects a plurality of seed points associated with the height field and calculates a Hessian matrix of the height field. The Hessian matrix is used by the computing platform to trace (a) one or more ridge curves associated with the height field and (b) one or more valley curves associated with the height field using the plurality of seed points.

17 Claims, 4 Drawing Sheets

(51) Int. Cl.
*G06T 7/181* (2017.01)
*G06K 9/00* (2006.01)

(56) References Cited

U.S. PATENT DOCUMENTS

| | | | | |
|---|---|---|---|---|
| 2011/0213243 | A1* | 9/2011 | Mallya | G06T 7/11 |
| | | | | 600/425 |
| 2013/0301897 | A1* | 11/2013 | Zhu | G06K 9/6207 |
| | | | | 382/132 |
| 2014/0093146 | A1* | 4/2014 | Inanc | G06K 9/00073 |
| | | | | 382/125 |

OTHER PUBLICATIONS

Musuvathy, Suraj, et al. "Principal curvature ridges and geometrically salient regions of parametric B-spline surfaces." Computer-Aided Design 43.7 (2011): 756-770.

* cited by examiner

ROBUST AUTOMATIC COMPUTATION OF RIDGES AND VALLEYS OF A HEIGHT FIELD

CROSS-REFERENCE TO RELATED APPLICATIONS

This application claims the benefit of U.S. Provisional Application Ser. No. 62/103,654 filed Jan. 15, 2015, which is incorporated herein by reference in its entirety.

TECHNICAL FIELD

The present invention relates generally to systems, methods, and apparatuses for the computation of ridges and valleys of a height field. The disclosed technology may be applied to, for example, data analysis, or any other applications where height fields are used.

BACKGROUND

A height field is a function that maps a point on the 2D plane to a scalar value. It can be visualized as the graph of the scalar values on the plane. An analogy is a terrain map consisting of mountains and valleys. The ridges of the mountains and bottom-most regions of the valleys form connected curves and reveal important mathematical characteristics of the height field. Height fields commonly occur in the analysis of shape and design properties or functional characteristics of products. Therefore, a robust algorithm for reliably computing ridge and valley curves is necessary.

Ridges and valleys are loci of points where the height value attains an extremum along one of the two eigenvectors of the Hessian matrix of the height field. When the extremum occurs along the smaller of the two eigenvalues, then the curve is a ridge, and when the extremum occurs along the larger of the two eigenvalues the curve is a valley. Existing approaches for computing ridges and valleys can be classified into two categories—sampling and tracing.

The sampling approach proceeds by evaluating surface differential properties and testing for the ridge and valley condition at a number of sample points on the plane. This approach can miss ridge and valley points if sufficiently high sampling resolutions are not used. This approach can also report false positives especially in narrow ridge/valley regions due to limited sampling resolutions. Further, the sampling approach only reports ridge and valley points, whereas ridges and valleys form continuous curves.

The tracing approach attempts to extract ridge and valley curves by identifying a set of starting points and following ridge and valley curves. Most approaches work on discrete representations of height fields and therefore are approximate and tend to suffer from inaccuracies and missed ridges and valleys.

SUMMARY

Embodiments of the present invention address and overcome one or more of the above shortcomings and drawbacks, by providing methods, systems, and apparatuses related to computation of ridges and valleys of a height field. The proposed techniques use an "advance and slide" procedure with a predetermined group of seed points to ensure complete identification of the ridges and valleys associated with the height field.

According to some embodiments, a computer-implemented method for computing ridges and valleys of a height field includes a computing platform receiving sample points associated with a dataset and an indication of an orientation for referencing the sample points and applying an interpolation function (e.g., B-spline) to the sample points to determine the height field. The computing platform selects seed points associated with the height field and calculates a Hessian matrix of the height field. The seed points may be selected, for example, by dividing the height field into subdomains based on the interpolation function and identifying seed points within each subdomain. The Hessian matrix is used by the computing platform to trace (a) one or more ridge curves associated with the height field and (b) one or more valley curves associated with the height field using the plurality of seed points. This general method may be applied to a variety of scenarios where height fields are used. For example, in some embodiments, the dataset comprises an image and the method further comprises detecting creases in the image using (a) the one or more ridge curves associated with the height field and (b) the one or more valley curves associated with the height field.

In some embodiments of the aforementioned method, each respective ridge curve associated with the height field is traced by a process which includes identifying a ridge seed point from the seed points and determining a smallest eigenvalue and largest eigenvalue of the Hessian matrix. The process further includes moving a step from the ridge seed point to a new point along a first eigenvector corresponding to the largest eigenvalue of the Hessian matrix. Once at the new point, the process iteratively moves the new point along a second eigenvector corresponding to the smallest eigenvalue of the Hessian matrix until a ridge condition is satisfied.

The seed points used in aforementioned method may include, for example, a first set of points corresponding to locations within the height field wherein a gradient is zero, a second set of points corresponding to locations within the height field where eigenvalues of the Hessian matrix are equal, and/or a third set of points corresponding to locations on boundaries of a domain where at least one of a ridge condition or a valley condition is satisfied.

In some embodiments of the aforementioned method, each respective valley curve associated with the height field is traced by a process which includes identifying a valley seed point from the seed points and determining a smallest eigenvalue and largest eigenvalue of the Hessian matrix. The process further includes moving a step from the valley seed point to a new point along a first eigenvector corresponding to the smallest eigenvalue of the Hessian matrix. Once at the new point, the process iteratively moves from the new point along a second eigenvector corresponding to the largest eigenvalue of the Hessian matrix until a valley condition is satisfied.

The aforementioned method may be implemented on a variety of computing platforms, including, without limitation, parallel processing platforms. Based on the characteristics of the platform, the method may be modified to take advantage of certain computing capabilities. For example, in some embodiments of the aforementioned method, the computing platform is configured to use the Hessian matrix to trace the one or more ridge curves and the one or more valley curves in parallel. For example, in one embodiment, the ridge curves and each of the one or more valley curves is traced in a distinct kernel executed by the computing platform.

According to other embodiments of the present invention, an article of manufacturing for computing ridges and valleys of a height field comprises a non-transitory, tangible computer-readable medium holding computer-executable instructions for performing the aforementioned, with or without the various enhancements, modifications, and additional features described above.

According to other embodiments, a system for computing ridges and valleys of a height field comprise a host computer and a device computer. The host computer is configured to receive sample points associated with a dataset and an indication of an orientation for referencing the plurality of sample points. The host computer applies interpolation function to the sample points to determine the height field, selects seed points associated with the height field, and calculates a Hessian matrix of the height field. The device computer is connected to the host computer and configured to use the Hessian matrix to trace (a) one or more ridge curves associated with the height field and (b) one or more valley curves associated with the height field in parallel using the plurality of seed points. In some embodiments, each of the one or more ridge curves and each of the one or more valley curves is traced in a distinct kernel executed by the device computer.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to the computation of ridge curves and valley curves in a height. Briefly, the height field is represented with a B-spline function. Several techniques for approximating or interpolating a scalar valued function with B-splines exist and may be applied with the techniques described herein. Then, based on the mathematical properties of ridge and valley curves, a robust tracing method is applied that extracts all ridge and valley curves of the height field using an advance and slide procedure. The various techniques described herein may be applied to any applications where height fields are used including, for example, various data analysis applications.

Figure 1:
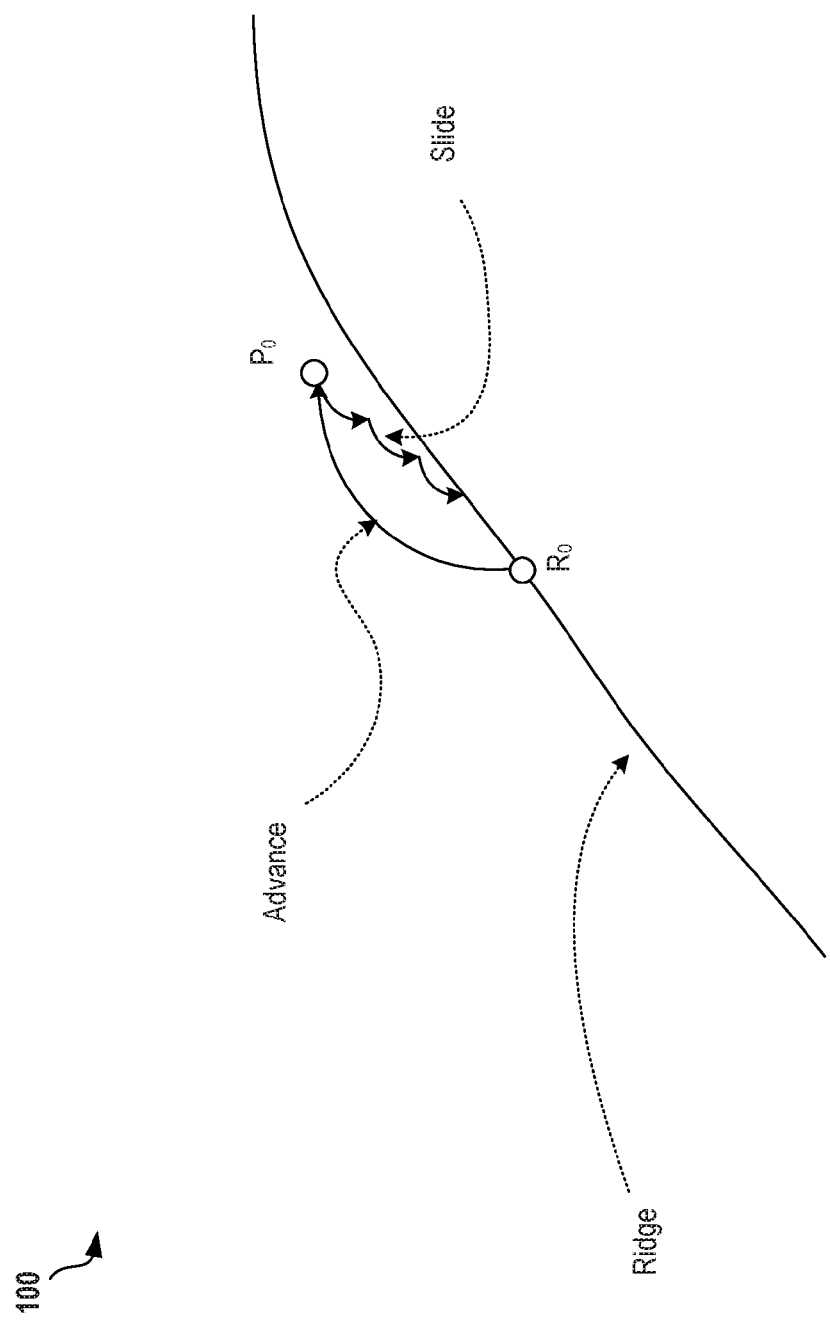
FIG. 1 provides an illustration of a process for computing ridge points for a height field, according to some embodiments.

FIG. 1 provides an illustration of a process 100 for computing ridge points for a height field, according to some embodiments. It should be noted that, although FIG. 1 illustrates the process for ridge points, a similar process could be applied to valley points. As an initial step, seed points are identified on a function describing the height field. In FIG. 1, one seed point is shown: $R_0$; however, it should be understood that many more seed points would be used in practice. Then starting at a seed point (in this example, $R_0$), an "advance" step is taken in the direction of eigenvector corresponding to the largest eigenvalue of the Hessian of the height function at that point. The size of this step may be varied and configured, for example, based on pre-existing knowledge of the height function or the underlying dataset. The advance step results in a move to position $P_0$. From this position, the algorithm moves iteratively ("slides") along the direction of the eigenvector corresponding to the smallest eigenvalue of the Hessian of the height function at that point until the ridge curve is reached. The advance and slide steps are repeated until another seed point is reached. This general process can be reversed to trace a valley curve. That is, starting from a valley point, an algorithm can advance in the direction of greatest curvature and then slide in the direction of least curvature.

In order to determine the directions of greatest and least curvature during the advance and slide procedure, the Hessian matrix associated with the height function may be used. The Hessian matrix is the Jacobian matrix of the second-order partial derivatives of the height function. Thus, for a two-dimensional height function $f(x,y)$, the Hessian matrix may be represented as:

$$H = \begin{bmatrix} \frac{\delta^2 f}{\delta x^2} & \frac{\delta^2 f}{\delta x \delta y} \\ \frac{\delta^2 f}{\delta y \delta x} & \frac{\delta^2 f}{\delta y^2} \end{bmatrix}$$

The eigenvector corresponding to the largest absolute eigenvalue of the Hessian matrix indicates the direction of greatest curvature of the height function. Thus, it provides an indication of the direction in which the gradient of the function changes the most. Conversely, the eigenvector corresponding to the smallest absolute eigenvalue of the Hessian matrix indicates the direction of least curvature of the height function. Thus, it provides an indication of the direction in which the gradient of the function changes the least. The corresponding eigenvalues in the Hessian matrix are the respective amounts of these curvatures.

Figure 2:
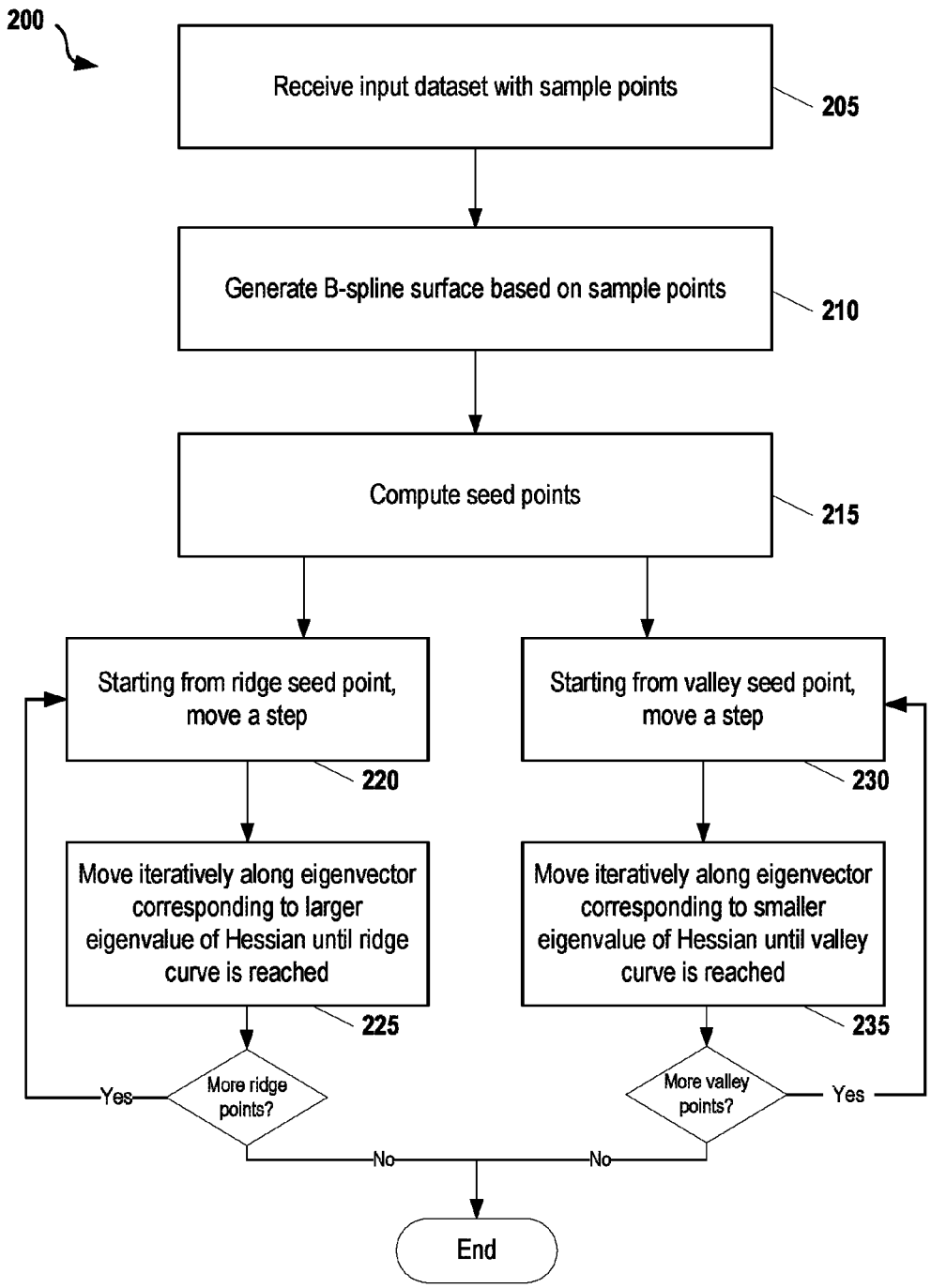
FIG. 2 illustrates a process for to computing ridges and valleys in a height field, according to some embodiments.

FIG. 2 illustrates a process 200 for computing ridges and valleys in a height field, according to some embodiments. Starting at step 205, an input dataset is received comprising a plurality of sample points. The sample points may be identified using any technique generally known in the art. For example, in some embodiments, a graphical user interface (GUI) is provided which allows a user to select sample points. The user may then use the GUI to select (e.g., by clicking) points in the proximity of the local minima and maxima.

Next, at step 210, a B-spline surface is generated using these sample points. B-spline surfaces are a class of surfaces generally known in the art and used for applications such as computer-aided design and computer graphic generation. A B-spline is a generalization of the Bezier curve and may generally be viewed as a piecewise polynomial function. B-splines offer highly accurate results for a given set of sample points with values proximal to maxima and minima. It should be noted that other interpolation schemes may alternatively be used to generate the surface at step 210. For example, in some embodiments, a set of interpolation functions may be available and the particular function utilized may be selected based on the characteristics of the underlying data.

Continuing with reference to FIG. 2, at step 215, seed points are computed using root finding techniques associated with the interpolation scheme used at step 210. Thus, for B-spline interpolation techniques, B-spline root finding techniques are employed. Any B-spline root finding technique generally known in the art may be used in finding the seed points. For example, as noted above, height field comprises of a set of terms, with each term represented as a multivariate B-spline function. In some embodiments, the seed points are identified using divide-and-conquer strategy where successively small subdomains of the height field are identified until only a single solution exists within each subdomain. Subdomains that do not contain a root are pruned. For each candidate subdomain that contains a single solution, a numerical scheme such as a multivariate Newton's method may be used to converge to an accurate solution.

The process of generating seed points is described in further detail below with respect to FIG. 3. Briefly, the seed points comprise three different sets of points. The first set of points includes points where the gradient of the height field is identically zero. These points are classified as ridge or valley seed points. The second set of points includes points where the eigenvalues of the Hessian of the height field are equal. The third set of points includes points on the boundaries of the domain where the ridge/valley condition is satisfied. These three sets of seed points will ensure all existing ridges and valleys will be analyzed.

Next, at steps 220-225, starting from a ridge seed point, a ridge curve is traced by using an advance and slide scheme. At step 220, the algorithm moves a step from the ridge seed point along the eigenvector corresponding to the largest eigenvalue of the Hessian. Next, at step 225, the algorithm moves iteratively along the eigenvector corresponding to the smallest eigenvalue of the Hessian until the ridge curve is reached. The ridge curve is reached when the ridge condition is satisfied. In this context, "ridge condition" occurs when the extremum occurs along the smaller of the two eigenvalues. Steps 220 and 225 are repeated until another seed point is reached.

At steps 230-235, starting from a valley seed point, a valley curve is traced by using a predictor-corrector type scheme. At step 230, the algorithm moves a step along the eigenvector corresponding to the smallest eigenvalue of the Hessian. Then, at step 235, the algorithm moves iteratively along the eigenvector corresponding to the largest eigenvalue of the Hessian until the valley curve is reached. The valley curve is reached when the valley condition is satisfied. The valley condition occurs when the extremum occurs along the larger of the two eigenvalues. Steps 230 and 235 are repeated until another seed point is reached.

Once the process 200 shown in FIG. 2 is complete, each ridge curve and valley curve in the height field will have been traced. At this point, the information may be presented to the user and/or saved for later use in more advanced processing techniques. For example, for an image field that is representative of an image, the valley and ridge information may be used to determine edges or other features in the image data.

It should be noted that, although the ridge seed point process (i.e., steps 220-225) and valley processing (i.e., steps 230-235) are shown in parallel in FIG. 2, this scheme is only one example of how processing may occur. For example, in other embodiments, sequential processing may be used (e.g., process ridge points then valley points, or vice versa). Also, interleaved processing schemes may also be used (i.e., process one valley point and then one ridge point). Moreover, because the processing associated with each point is independent of other points, parallel processing techniques may also be employed to process multiple (if not all) the seed points in parallel. Then, the data from the various parallel processing resources may be aggregated to provide a full representation of the valley and ridge curves. The concept of utilizing parallel process for curve generation is discussed in further detail below with respect to FIG. 4.

Figure 3:
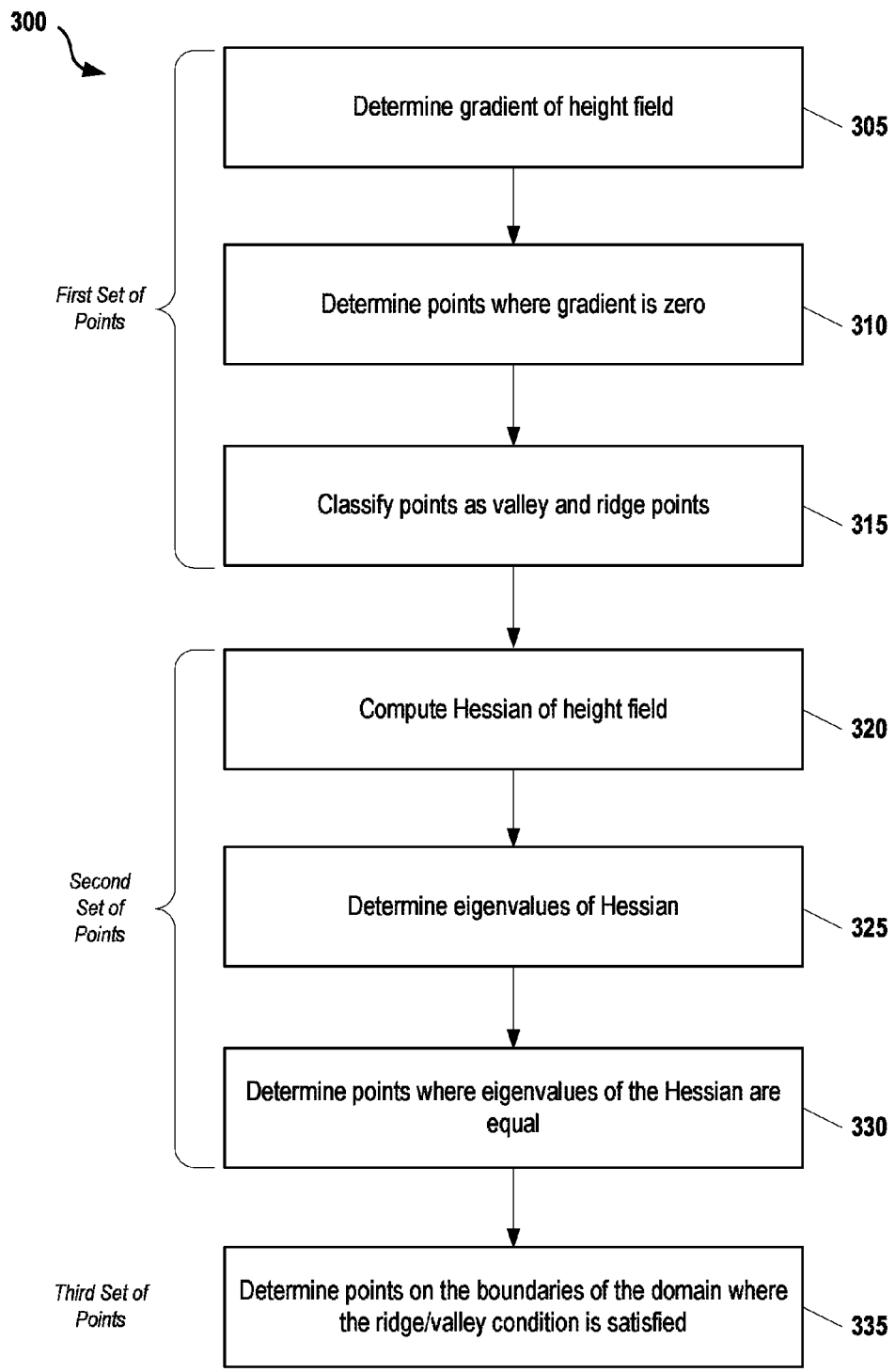
FIG. 3 provides a flowchart illustrating a process for identifying seed points, according to some embodiments.

FIG. 3 provides a flowchart illustrating a process 300 for identifying seed points, according to some embodiments. Prior to the start of the process 300, it is assumed that a function descriptive of the height field has been generated (e.g., using a B-spline function, as described above with respect to FIG. 2). The process 300 may be applied to the entire height field. Alternatively, where a piecewise interpolation process (e.g., B-spline), the height field may he may be successively divided into smaller subdomains and the process 300 may be applied to each subdomain where seed points may be exist.

The process 300 is essentially executed in three sections, each section generating a set of points. It should be noted that the three sets of points may be generated in any order and, in some embodiments, the various steps of the process 300 may be executed in parallel. Thus, the flowchart provided in FIG. 3 should only be viewed as illustrative of one way that the seed points may be identified.

At steps 305-315, a first set of points is determined. Starting at step 305, the gradient of the height field is determined. Techniques for computing the gradient of a function with multiple inputs are generally known in the art and, thus, not explained in detail here. The gradient provides an indication of the greatest increase of the output. At step 310, the gradient is evaluated to determine points where it is zero. These points, referred to herein as "critical points," correspond to the local minimums or local maximums. In order to differentiate between local minimums and maximums, the gradients in the neighborhood of the critical point are analyzed. If a critical point is a local maximum then all gradients in the neighborhood of that point will be directed toward the critical point. Conversely, if a critical point is a local minimum then all gradients in the neighborhood of that critical point are directed away from the critical point. Using this insight, at step 315, the critical points that are local maximums are classified as ridge points, while the local minimums are classified as valley points. The first set of points then comprises these valley and ridge points.

Continuing with reference to FIG. 3, at steps 320-330, a second set of points is determined. Starting at step 320, the Hessian matrix of the height field is computed. Next, at step 325, the eigenvalues on the Hessian matrix H are determined. Techniques for determining eigenvalues are generally known in the art and, thus, not explained in detailed here. At step 330, points where the eigenvalues of H are equal are identified. The identified points are retained as the second set of points.

At step 335, a third set of points is determined on the boundaries of the domain where the ridge/valley condition is satisfied. Along the boundaries, one of the parameter values (x or y) of the function $z=f(x,y)$ are fixed. For example in the domain $[0,1]\times[0,1]$, the four boundary curves are $x=0$, $x=1$, $y=0$, $y=1$. Critical points are computed on the boundary curves by solving for the roots of the equation (gradient f) $(x,y)=0$, where x or y is restricted to the boundaries.

Figure 4:
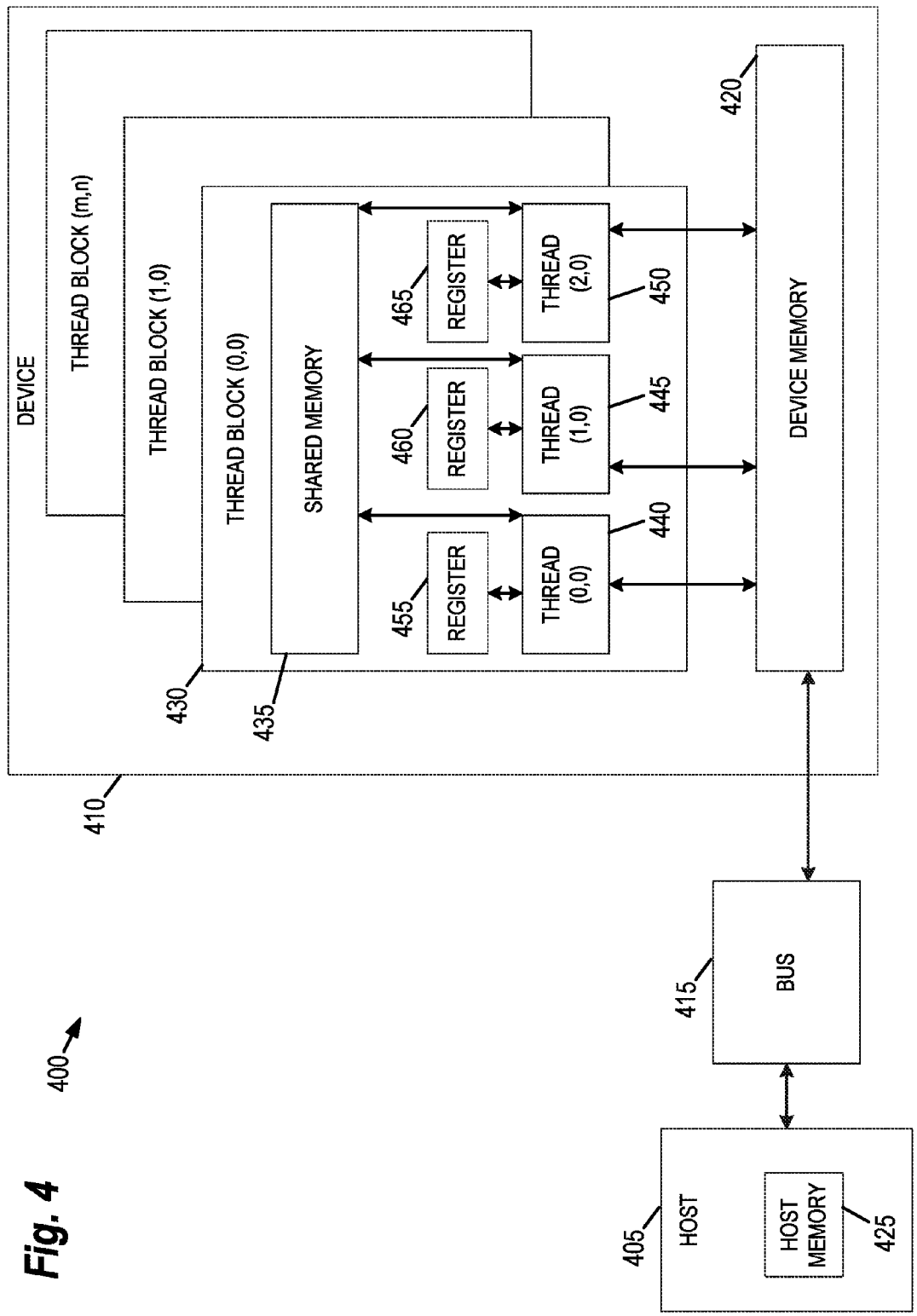
FIG. 4 provides an example of a parallel processing memory architecture that may be utilized to perform computations related to height field processing, according to some embodiments of the present invention.

FIG. 4 provides an example of a parallel processing memory architecture 400 that may be utilized to perform computations related to height field processing, according to some embodiments of the present invention. This architecture 400 may be used in embodiments of the present invention where NVIDIA™ CUDA (or a similar parallel computing platform) is used. The architecture includes a host computing unit ("host") 405 and a GPU device ("device") 410 connected via a bus 415 (e.g., a PCIe bus). The host 405 includes the CPU (not shown in FIG. 4) and host memory 425 accessible to the CPU. The device 410 includes the GPU and its associated memory 420, referred to herein as device memory. The device memory 420 may include various types of memory, each optimized for different memory usages. For example, in some embodiments, the device memory includes global memory, constant memory, and texture memory.

Parallel portions of a height field processing application may be executed on the architecture 400 as "device kernels" or simply "kernels." A kernel comprises parameterized code configured to perform a particular function. The parallel computing platform is configured to execute these kernels in an optimal manner across the architecture 400 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by a grid of thread blocks (described in greater detail below). Using concurrent kernel execution, streams, and synchronization with lightweight events, the architecture 400 of FIG. 4 (or similar architectures) may be used to parallelize ridge point processing (see, e.g., steps 220-225 in FIG. 2) and valley point processing (see, e.g., steps 230-235 in FIG. 2). For example, in one embodiment, there are two kernels used: one dedicated to ridge processing and one dedicated to valley processing. It should also be noted that alternative configurations may be applied. For example, in some embodiments each seed point may be assigned a different kernel and the various kernels can be executed in parallel. Additionally, in some embodiments, the parallelization of the individual kernels may be customized to optimize the overall processing of the height field based on a priori knowledge of the characteristics of the height field. For example, more complex areas of the height field may be given more processing resources than simpler areas.

The device 410 includes one or more thread blocks 430 which represent the computation unit of the device 410. The term thread block refers to a group of threads that can cooperate via shared memory and synchronize their execution to coordinate memory accesses. For example, in FIG. 4, threads 440, 445 and 450 operate in thread block 430 and access shared memory 435. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 4, the thread blocks 430 are organized in a two dimensional grid structure with m+1 rows and n+1 columns Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of ridge and valley seed points may be partitioned over thread blocks automatically by the parallel computing platform software. However, in other embodiments, the individual thread blocks can be selected and configured to optimize height field processing. For example, in one embodiment, each thread block is assigned a group of seed points proximally located to one another. These groups overlap from thread block to thread block, allowing full processing of the height field curve in a particular region.

Continuing with reference to FIG. 4, registers 455, 460, and 465 represent the fast memory available to thread block 430. Each register is only accessible by a single thread. Thus, for example, register 455 may only be accessed by thread 440. Conversely, shared memory is allocated per thread block, so all threads in the block have access to the same shared memory. Thus, shared memory 435 is designed to be accessed, in parallel, by each thread 440, 445, and 450 in thread block 430. Threads can access data in shared memory 435 loaded from device memory 420 by other threads within the same thread block (e.g., thread block 430). The device memory 420 is accessed by all blocks of the grid and may be implemented using, for example, Dynamic Random-Access Memory (DRAM).

Each thread can have one or more levels of memory access. For example, in the architecture 400 of FIG. 4, each thread may have three levels of memory access. First, each thread 440, 445, 450, can read and write to its corresponding registers 455, 460, and 465. Registers provide the fastest memory access to threads because there are no synchronization issues and the register is generally located close to a multiprocessor executing the thread. Second, each thread 440, 445, 450 in thread block 430, may read and write data to the shared memory 435 corresponding to that block 430. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 410 to read and/or write to the device memory. Device memory requires the longest time to access because access must be synchronized across the thread blocks operating on the device. Thus, in some embodiments, the processing of each seed point is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 4, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 45 U.S.C. 112, sixth paragraph, unless the element is expressly recited using the phrase "means for."

The invention claimed is:

1. A computer-implemented method for computing ridges and valleys of a height field, the method comprising:
   receiving, by a computing platform, a plurality of sample points associated with a dataset and an indication of an orientation for referencing the plurality of sample points;
   applying, by the computing platform, an interpolation function to the plurality of sample points to determine the height field;
   selecting, by the computing platform, a plurality of seed points associated with the height field;
   calculating, by the computing platform, a Hessian matrix of the height field; and
   using, by the computing platform, the Hessian matrix to trace (a) one or more ridge curves associated with the height field and (b) one or more valley curves associated with the height field using the plurality of seed points,
   wherein the computing platform uses the Hessian matrix to trace the one or more ridge curves and the one or more valley curves in parallel and each ridge curve and each valley curve is traced in a distinct kernel executed by the computing platform.

2. The method of claim 1, wherein the interpolation function comprises a B-spline function.

3. The method of claim 2, wherein the plurality of seed points are selected by dividing the height field into a plurality of subdomains based on the B-spline function and identifying seed points within each subdomain.

4. The method of claim 2, wherein each respective ridge curve associated with the height field is traced by a process comprising:
   identifying a ridge seed point from the plurality of seed points;
   determining a smallest eigenvalue and largest eigenvalue of the Hessian matrix;
   move a step from the ridge seed point to a new point along a first eigenvector corresponding to the largest eigenvalue of the Hessian matrix; and
   move iteratively from the new point along a second eigenvector corresponding to the smallest eigenvalue of the Hessian matrix until a ridge condition is satisfied.

5. The method of claim 2, wherein each respective valley curve associated with the height field is traced by a process comprising:
   identifying a valley seed point from the plurality of seed points;
   determining a smallest eigenvalue and largest eigenvalue of the Hessian matrix;
   move a step from the valley seed point to a new point along a first eigenvector corresponding to the smallest eigenvalue of the Hessian matrix; and
   move iteratively from the new point along a second eigenvector corresponding to the largest eigenvalue of the Hessian matrix until a valley condition is satisfied.

6. The method of claim 1, wherein the plurality of seed points comprise a first set of points corresponding to locations within the height field wherein a gradient is zero.

7. The method of claim 6, wherein the plurality of seed points comprise a second set of points corresponding to locations within the height field where eigenvalues of the Hessian matrix are equal.

8. The method of claim 7, wherein the plurality of seed points comprise a third set of points corresponding to locations on boundaries of a domain where at least one of a ridge condition or a valley condition is satisfied.

9. The method of claim 1, wherein the dataset comprises an image and the method further comprises:
   detecting creases in the image using (a) the one or more ridge curves associated with the height field and (b) the one or more valley curves associated with the height field.

10. An article of manufacturing for computing ridges and valleys of a height field, the article of manufacture comprising a non-transitory, tangible computer-readable medium holding computer-executable instructions for performing a method comprising:
    receiving a plurality of sample points associated with a dataset and an indication of an orientation for referencing the plurality of sample points;

applying an interpolation function to the plurality of sample points to determine the height field;

selecting a plurality of seed points associated with the height field; calculating a Hessian matrix of the height field; and using the Hessian matrix to trace (a) one or more ridge curves associated with the height field and (b) one or more valley curves associated with the height field using the plurality of seed points;

wherein the one or more ridge curves and the one or more valley curves are traced in parallel using a plurality of thread blocks and each thread block processes a distinct subset of seed points.

11. The article of manufacture of claim 10, wherein each respective ridge curve associated with the height field is traced by a process comprising:

identifying a ridge seed point from the plurality of seed points;

determining a smallest eigenvalue and largest eigenvalue of the Hessian matrix;

move a step from the ridge seed point to a new point along a first eigenvector corresponding to the largest eigenvalue of the Hessian matrix; and move iteratively from the new point along a second eigenvector corresponding to the smallest eigenvalue of the Hessian matrix until a ridge condition is satisfied.

12. The article of manufacture of claim 10, wherein each respective valley curve associated with the height field is traced by a process comprising:

identifying a valley seed point from the plurality of seed points;

determining a smallest eigenvalue and largest eigenvalue of the Hessian matrix;

move a step from the valley seed point to a new point along a first eigenvector corresponding to the smallest eigenvalue of the Hessian matrix; and move iteratively from the new point along a second eigenvector corresponding to the largest eigenvalue of the Hessian matrix until a valley condition is satisfied.

13. The article of manufacture of claim 10, wherein the plurality of seed points comprise a first set of points corresponding to locations within the height field wherein a gradient is zero.

14. The article of manufacture of claim 13, wherein the plurality of seed points comprise a second set of points corresponding to locations within the height field where eigenvalues of the Hessian matrix are equal.

15. The article of manufacture of claim 14, wherein the plurality of seed points comprise a third set of points corresponding to locations on boundaries of a domain where at least one of a ridge condition or a valley condition is satisfied.

16. The article of manufacture of claim 10, wherein the dataset comprises an image and the method further comprises:

detecting edges in the image using (a) the one or more ridge curves associated with the height field and (b) the one or more valley curves associated with the height field.

17. A system for computing ridges and valleys of a height field, the system comprising:

a host computer configured to:
  receive a plurality of sample points associated with a dataset and an indication of an orientation for referencing the plurality of sample points,
  apply an interpolation function to the plurality of sample points to determine the height field,
  select a plurality of seed points associated with the height field, and
  calculate a Hessian matrix of the height field; and a device computer connected to the host computer and configured to use the Hessian matrix to trace (a) one or more ridge curves associated with the height field and (b) one or more valley curves associated with the height field in parallel using the plurality of seed points and a plurality of thread blocks, wherein each thread block processes a distinct subset of the plurality of seed points.

* * * * *